(12) United States Patent
Zong et al.

(10) Patent No.: US 9,083,246 B2
(45) Date of Patent: Jul. 14, 2015

(54) CONTROL CIRCUIT FOR PRIMARY SIDE CONTROL OF SWITCHING POWER SUPPLY

(75) Inventors: Qiang Zong, Shanghai (CN); Huizhen Zhu, Shanghai (CN); Pingan Zhao, Shanghai (CN); Yajiang Zhu, Shanghai (CN)

(73) Assignee: BCD Semiconductor Manufacturing CO., LTd., Shanghai (CN)

( * ) Notice: Subject to any disclaimer, the term of this patent is extended or adjusted under 35 U.S.C. 154(b) by 1094 days.

(21) Appl. No.: 13/090,680

(22) Filed: Apr. 20, 2011

(65) Prior Publication Data

US 2011/0261596 A1    Oct. 27, 2011

(30) Foreign Application Priority Data

Apr. 27, 2010   (CN) .......................... 2010 1 0157899

(51) Int. Cl.
*H02M 3/335* (2006.01)
(52) U.S. Cl.
CPC ............................... *H02M 3/33507* (2013.01)
(58) Field of Classification Search
USPC ..................... 363/19, 21.12–21.18, 50, 89–90
See application file for complete search history.

(56) References Cited

U.S. PATENT DOCUMENTS

| | | | |
|---|---|---|---|
| 6,404,654 B1 * | 6/2002 | Wang ............................... | 363/19 |
| 6,853,563 B1 † | 2/2005 | Yang | |
| 7,102,889 B1 | 9/2006 | Barsun | |
| 7,313,004 B1 * | 12/2007 | Yang et al. ................. | 363/21.02 |
| 7,643,315 B2 * | 1/2010 | Blaha et al. ................. | 363/21.13 |
| 7,760,520 B2 * | 7/2010 | Jang et al. .................. | 363/21.18 |
| 8,018,743 B2 * | 9/2011 | Wang et al. ................. | 363/21.18 |
| 8,018,749 B2 * | 9/2011 | Fitzgerald ...................... | 363/127 |
| 8,213,203 B2 * | 7/2012 | Fei et al. ........................ | 363/131 |
| 2005/0254268 A1 * | 11/2005 | Reinhard et al. ................ | 363/20 |
| 2007/0121258 A1 * | 5/2007 | Hachiya .......................... | 361/18 |
| 2007/0159856 A1 * | 7/2007 | Yang .......................... | 363/21.12 |
| 2007/0210772 A1 * | 9/2007 | Sawtell ......................... | 323/282 |
| 2008/0310191 A1 * | 12/2008 | Zhu et al. .................... | 363/21.04 |
| 2009/0267583 A1 * | 10/2009 | Hsu et al. ..................... | 323/284 |
| 2010/0128501 A1 * | 5/2010 | Huang et al. ............... | 363/21.16 |

(Continued)

FOREIGN PATENT DOCUMENTS

EP     1 146 630 A2    10/2001

OTHER PUBLICATIONS

Power Integrations, "LNK603-606/613-616 LinkSwitch-II Family", 20 pgs, Jun. 2008 [retrieved from www.alldatasheet.com on Oct. 8, 2012].†

*Primary Examiner* — Adolf Berhane
*Assistant Examiner* — Nusrat Quddus

(57) ABSTRACT

A switched mode power supply (SMPS) includes a transformer with a primary winding, a secondary winding, an auxiliary winding, and a power switch coupled to the primary winding. During one switching cycle, the auxiliary winding provides a feedback signal which includes a first voltage pulse that is induced after the power switch is turned on and a second voltage pulse that is induced after the power switch is turned off. A control circuit includes a circuit for generating a sampling signal for sampling the second voltage pulse in a switching cycle at a time that is determined based on the first voltage pulse in the same switching cycle. A sample-and-hold circuit is configured for sampling and storing the second voltage pulse in response to the sampling signal. A switching signal generating circuit is configured to generate a switching signal for controlling the power switch based on an output of the sample-and-hold circuit.

24 Claims, 7 Drawing Sheets

(56) References Cited

U.S. PATENT DOCUMENTS

| | | | |
|---|---|---|---|
| 2011/0095733 A1* | 4/2011 | Park et al. | 323/207 |
| 2011/0096573 A1* | 4/2011 | Zhu et al. | 363/21.17 |
| 2011/0102950 A1* | 5/2011 | Park et al. | 361/18 |
| 2011/0122659 A1* | 5/2011 | Duan et al. | 363/21.16 |
| 2011/0261596 A1* | 10/2011 | Zong et al. | 363/21.13 |
| 2012/0327691 A1* | 12/2012 | Strijker | 363/21.01 |

\* cited by examiner
† cited by third party

CONTROL CIRCUIT FOR PRIMARY SIDE CONTROL OF SWITCHING POWER SUPPLY

CROSS-REFERENCES TO RELATED APPLICATIONS

This application claims priority to Chinese Patent Application No. 201010157899, filed Apr. 27, 2010, which is commonly owned and incorporated by reference in its entirety herein for all purposes.

BACKGROUND OF THE INVENTION

The present invention relates generally to the field of switch mode power supply (SMPS). More particularly, embodiments of the present invention relate to circuits and methods for primary side control of a flyback switching power supply.

Switching power supplies have become increasingly important in today's technologies, from personal computers to portable electronic devices. Compared with traditional linear power supplies, switching mode power supplies have advantages such as small size, good stability, high efficiency, and low cost, etc. As a result, switching power supplies are commonly used in low-cost, low power applications. Among the many types of switching power supplies, flyback switching power supplies are widely used, in which a transformer is used to provide electrical isolation between input and output. The transformer in a SMPS usually has a primary winding, a secondary winding, and one or more of the auxiliary windings.

In secondary side control of flyback converter, signals from the output side are provided through an optical coupler to the primary side, where a controller uses the feedback signal to control the power switch. In contrast, in primary side control of flyback converter, the feedback signal is taken from an auxiliary winding on the primary side, thereby saving the cost of the optical coupler. When the primary power switch is turned off, an auxiliary transformer winding is used to reflect the secondary winding voltage. However, the voltage pulse induced on the auxiliary winding often includes an unstable ripple portion in the beginning of the pulse. Therefore, it is important to sample the feedback signal from the auxiliary winding at an appropriate time during the induced voltage pulse to obtain a feedback signal that is representative of the state of the power supply output.

Feedback voltage signal Vfb is usually sampled during the positive phase of the switching cycle, i.e., when Vfb is positive. This condition occurs when the power switch is turned off and currents are induced in the secondary winding and the auxiliary winding. A conventional sampling technique described in EP 1 146 630 A2 involves waiting for a fixed delay time after the positive feedback pulse is started before sampling the positive feedback pulse. Another conventional technique described in U.S. Pat. No. 7,102,889 involves measuring the duration of the positive feedback pulse in an earlier switching cycle, and sampling the feedback signal in the next switching cycle after a delay that is based on a fraction of the measured duration of the positive pulse in the previous switching cycle.

As described below, these conventional techniques tend to be inflexible and often increase the cost of the system. Therefore, improved techniques for generating the sampling signal in the primary side regulated flyback system are desirable.

BRIEF SUMMARY OF THE INVENTION

Some embodiments of the present invention relate to circuits and methods for primary side control of flyback switching power supply. Merely as examples, embodiments of the invention have been applied to a feedback signal sampling circuit and a protection circuit in a flyback switching power supply. But it will be appreciated that the invention has a much wider scope and can be used to other types of switch mode power supplies.

As described above, conventional techniques for controlling a switch mode power supply are often unsatisfactory. For example, the fixed delay sampling method may work for a specific configuration of output load, but would be costly if it needs to be tailored for different applications. The second method measures the duration of the positive feedback pulse in a previous switching cycle and uses a fraction of that during as the delay for sampling in the next switching cycle. The second method may be an improvement over the fixed delay method, but it is still susceptible to variations between switching cycles, for example, in the primary peak current and the output voltage fluctuations. Therefore, improved techniques for controlling a switch mode power supply are highly desirable.

The inventors of the present invention have recognized that, in a single switching cycle, the time integral of the absolute value of the negative voltage pulse across the auxiliary winding (when power switch transistor is turned on) is equal to the time integral of the absolute value of the positive voltage pulse across the auxiliary winding (when power switch transistor is turned off). Therefore, according to embodiments of the present invention, information provided in the first phase of the switching cycle, when power switch is on, can be used to control the power supply in the second phase of the same switching cycle, when the power switch is off. As a result, changes in the power supply or load conditions can be captured and applied in the same switching cycle.

As described below, in a specific embodiment, information obtained in the on-phase of the switching cycle is used to determine a time instant for sampling the feedback signal during the off-phase of the same switching cycle for controlling the power supply. In a specific embodiment, a first voltage-controlled current source is derived from the feedback signal during the on-phase of the switching cycle. Total charges accumulated by charging a capacitor using the first current source during this phase are then discharged through a second current source, which is derived from the feedback signal during the off-phase of the switching cycle. By selecting a suitable ratio between the first and the second current sources, an appropriate time for sampling the feedback signal in the positive phase of the same switching cycle can be determined. As a result, any changes in the power supply or output load conditions can be reflected in the control signals during the same switching cycle. In another embodiment, information obtained in the on-phase is used in a protective circuit of the power supply.

According to an embodiment of the present invention, a control circuit is configured for controlling the output power of a switched mode power supply (SMPS). The SMPS includes a transformer with a primary winding, a secondary winding, and an auxiliary winding. The SMPS also includes a power switch coupled to the primary winding. During one switching cycle, the auxiliary winding provides a feedback signal which includes a first voltage pulse that is induced when the power switch is turned on and a second voltage pulse that is induced when the power switch is turned off. The control circuit includes a sampling signal generation circuit for generating a sampling signal for sampling the second voltage pulse in a switching cycle at a time that is determined based on the first voltage pulse in the same switching cycle. The control circuit also includes a sample-and-hold circuit coupled to the sampling generation circuit for receiving the sampling signal. The sample-and-hold circuit is configured for sampling the second voltage pulse in response to the sampling signal and storing the sampled value of the second voltage pulse. The control circuit also includes a switching signal generation circuit coupled to the sample-and-hold circuit and configured to generate a switching signal for controlling the power switch based on an output of the sample-and-hold circuit.

In an embodiment of the above control circuit, the sampling signal generation circuit includes a capacitor, a first current source for charging the capacitor, and a second current source for discharging the capacitor. The first current source provides a charging current derived from the first voltage pulse of the feedback signal, and the second current source provides a discharging current derived from the second voltage pulse of the feedback signal. The capacitor is charged during the first voltage pulse and then discharged during the second voltage pulse. The sampling signal generation circuit is configured to generate the sampling signal when the capacitor is discharged to a reference voltage level.

In another embodiment of the above control circuit, the sampling signal generation circuit is configured to generate the sampling signal when total charges accumulated on the capacitor during the first voltage pulse are substantially discharged during the second voltage pulse. In another embodiment, a timing of the sampling signal during the second voltage pulse is based on a ratio of the charging current and discharging current.

In another embodiment of the above control circuit, the first current source includes first and second NPN bipolar transistors in a current-mirror configuration, wherein an emitter of the first NPN bipolar transistor is coupled to the feedback signal through a resistive voltage divider formed by first and second resistors, and an emitter of the second NPN bipolar transistor is coupled to ground. The first current source also includes first and second PMOS transistors in a current-mirror configuration, the drain terminals of the first and second PMOS transistors being coupled to corresponding collector terminals of the first and second NPN bipolar transistors. The first current source also includes a third PMOS transistor coupled to the first and second PMOS transistors for providing the charging current.

In another embodiment of the above control circuit, the second current source includes a differential amplifier having a positive input coupled to the feedback signal through the resistive voltage divider, an NMOS transistor having a gate coupled to an output of the differential amplifier and source coupled to a negative input of the differential amplifier, a third resistor coupled between a source of the NMOS transistor and the ground, and a current-mirror coupled to the NMOS transistor for providing the discharging current.

According to another embodiment of the present invention, a switched mode power supply (SMPS) includes a transformer with a primary winding, a secondary winding, and an auxiliary winding, a power switch coupled to the primary winding, and a control circuit for controlling the output power of the SMPS. In the SMPS, during one switching cycle, the auxiliary winding provides a feedback signal which includes a first voltage pulse that is induced after the power switch is turned on and a second voltage pulse that is induced after the power switch is turned off. The control circuit includes a sampling signal generation circuit for generating a sampling signal for sampling the second voltage pulse in a switching cycle at a time that is determined based on the first voltage pulse in said switching cycle. The control circuit also includes a sample-and-hold circuit coupled to the sampling generation circuit for receiving the sampling signal. The sample-and-hold circuit is configured for sampling the second voltage pulse in response to the sampling signal and storing the sampled value of the second voltage pulse. The control circuit also includes a switching signal generation circuit coupled to the sample-and-hold circuit and configured to generate a switching signal for controlling the power switch based on an output of the sample-and-hold circuit.

According to another embodiment of the present invention, a method is provided for controlling the output power of a switched mode power supply (SMPS). The SMPS includes a transformer with a primary winding, a secondary winding, and an auxiliary winding. The SMPS also includes a power switch coupled to the primary winding. During one switching cycle, the auxiliary winding provides a feedback signal which includes a first voltage pulse that is induced after the power switch is turned on and a second voltage pulse that is induced after the power switch is turned off. The method includes generating a sampling signal for sampling the second voltage pulse in a switching cycle at a time that is determined based on the first voltage pulse in said switching cycle, sampling the second voltage pulse in response to the sampling signal and storing the sampled value of the second voltage pulse, and generating a switching signal for controlling the power switch based on an output of the sample-and-hold circuit.

In an embodiment of the above method, generating a sampling signal includes charging a capacitor using a charging current derived from the first voltage pulse of the feedback signal, discharging the capacitor using a discharging current derived from the second voltage pulse of the feedback signal, and generating the sampling signal when the capacitor is discharged to a reference voltage level. In another embodiment of the above method, generating a sampling signal includes charging a capacitor using a charging current derived from the first voltage pulse of the feedback signal, discharging a capacitor using a discharging current derived from the second voltage pulse of the feedback signal, and generating the sampling signal when total charges accumulated on the capacitor during the first voltage pulse are substantially discharged during the second voltage pulse.

According to yet another embodiment of the present invention, a method is provided for controlling a switch mode power supply (SMPS). The SMPS includes a transformer with a primary winding, a secondary winding, and an auxiliary winding. The SMPS also includes a power switch coupled to the primary winding. During one switching cycle, the auxiliary winding provides a feedback signal which includes a first voltage pulse that is induced after the power switch is turned on and a second voltage pulse that is induced after the power switch is turned off. The method includes monitoring the first voltage pulse of the feedback signal to obtain a maximum magnitude of the feedback signal, comparing the feedback signal with the maximum magnitude, and providing a protection signal for turning off the power switch based on comparing the feedback signal with the maximum magnitude. In a specific embodiment, monitoring the feedback signal includes monitoring the second voltage pulse of the feedback signal to obtain a maximum magnitude of the feedback signal. In an alternative embodiment, monitoring the feedback signal comprises monitoring the first voltage pulse of the feedback signal to obtain a maximum magnitude of the feedback signal. In an embodiment, the method includes providing the protection signal for turning off the power switch, when the feedback signal drops below a predefined fraction of the maximum magnitude. In another embodiment, the method includes providing the protection signal for turning off the power switch, when the feedback signal is smaller than the maximum magnitude by a predetermined amount.

In another embodiment, a protection circuit operable to perform the above method includes a voltage-controlled current source configured to provide a current representing the feedback signal, first and second resistors in a voltage divider configuration and coupled to the current source, and a voltage follower circuit including a constant current source, a resistor, an NPN transistor, and a PNP transistor. The protection circuit also includes a capacitor coupled to the voltage follower, an MOS transistor connected in parallel with the capacitor, with a gate of the MOS transistor coupled to a switch signal for controlling the power switch. The protection circuit also includes a comparator with a first input coupled to the capacitor and a second input coupled to the voltage-controlled current source.

In yet another embodiment, a switch mode power supply (SMPS) is operable to perform the above protection method. The SMPS includes a transformer with a primary winding, a secondary winding, and an auxiliary winding. The SMPS also includes a power switch coupled to the primary winding. During one switching cycle, a first voltage pulse is induced after the power switch is turned on, and a second voltage pulse is induced after the power switch is turned off.

A further understanding of the nature and advantages of the present invention may be realized by reference to the remaining portions of the specification and the drawings.

DETAILED DESCRIPTION OF THE INVENTION

Merely for illustration, some embodiments of the present invention are described below using examples of fly-back converters for AC/DC or DC/DC conversion. However, embodiments of the invention are not limited to such converters. For example, embodiments of the present invention can be applied to any converters in which quick adjustment to output load conditions is desired.

The description below is presented with reference to a series of drawing figures enumerated above. These diagrams are merely examples, and should not unduly limit the scope of the claims herein. In connection with the various aspects illustrated and described, one of ordinary skill in the art would recognize other variations, modifications, and alternatives.

Figure 1:
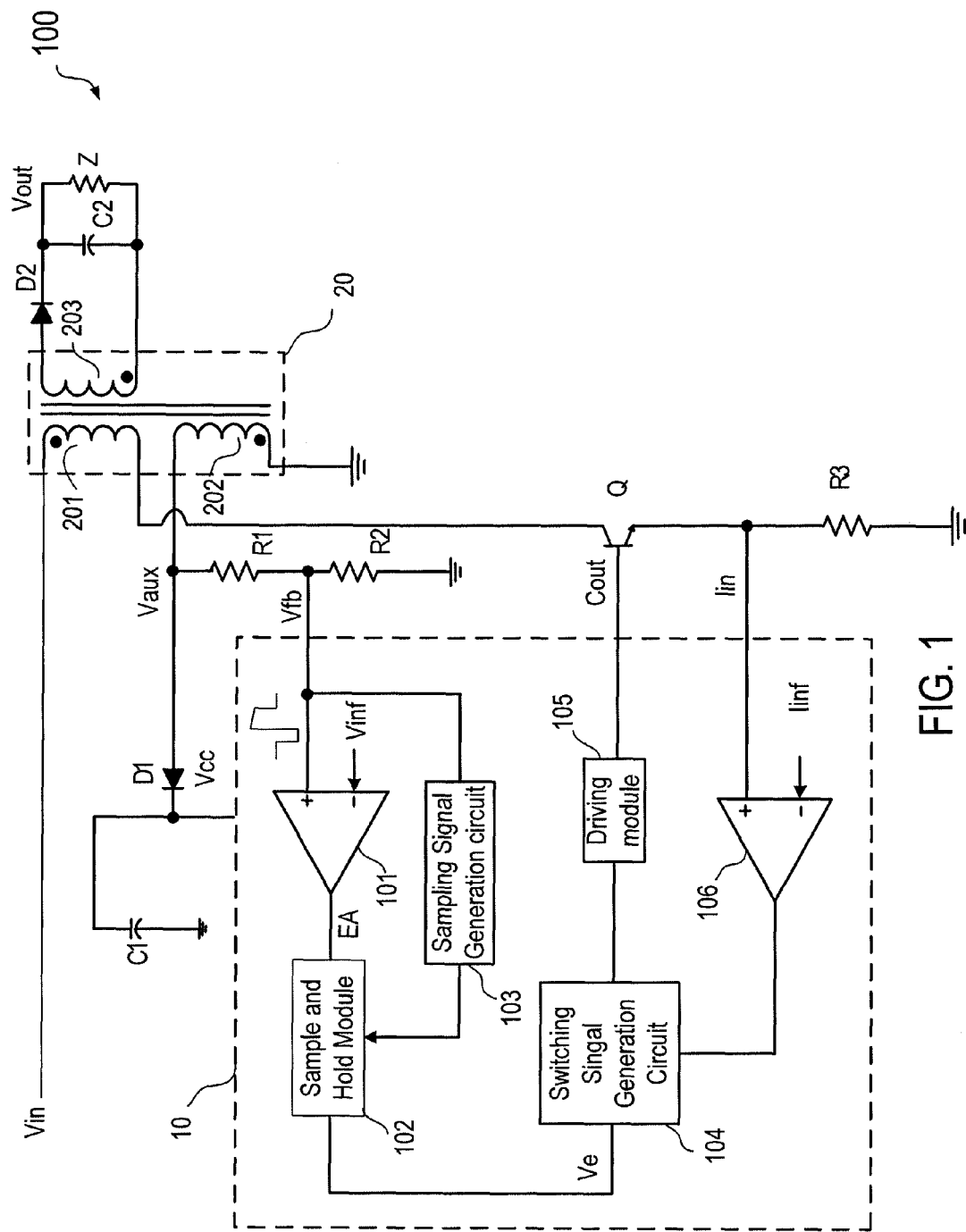
FIG. 1 is a simplified block diagram illustrating a fly back converter 100 according to an embodiment of the present invention.

FIG. 1 is a simplified block diagram illustrating a fly back converter 100 according to an embodiment of the present invention. As shown, flyback converter 100 includes a control circuit 10, a transformer 20, a power switch Q, a first resistor R1, a second resistor R2, a current sense resistor R3, a primary rectifier D1, a secondary rectifier D2, a supply capacitor C1, and an output capacitor C2. Transformer 20 includes a primary winding 201, an auxiliary winding 202, and a secondary winding 203. The switching signal output Cout from control circuit 10 is applied to power switch Q to turn on and off the current flow in primary winding 201. Power switch Q is grounded through resistor R3. Current sense resistor R3 is coupled to power switch Q and provides a measure of the primary current to terminal Iin of control circuit 10. Line voltage Vin is connected to primary winding 201. The voltage at auxiliary winding 202 is designated as Vaux. A feedback signal Vfb is taken from Vaux through voltage divider resistors R1 and R2. Vaux also provides operating power to control circuit 10 through rectifier D1 and capacitor C1. Secondary winding 203 provides an output voltage Vout of the power supply through rectifier D2 and output capacitor C2. A Load, represented by impedance Z, is coupled in parallel with output capacitor C2. Control circuit 10, by controlling the power switch Q on-time or off-time, provides output capacitor C2 with a stable output voltage.

As shown in FIG. 1, control circuit 10 includes an amplifier 101, a sample-and-hold circuit 102, a sampling signal generation circuit 103, a switch signal generation circuit 104, a drive unit 105, and a current comparator 106. Amplifier 101 receives feedback voltage input Vfb and a reference voltage Vinf, and provides an input signal EA to sample-and-hold unit 102. The sampling signal generation unit 103 receives feedback voltage input Vfb and provides a sampling signal to sample-and-hold circuit 102. The output of sample and hold circuit 102, which represents a state of the power supply output, is provided to switching signal generation circuit 104 for controlling power switch Q. The output of switching signal generation circuit 104 is connected to drive circuit 105, which provides signal Cout to power switch Q. Current comparator 106 is connected the current detection input Iin to sense the current flow in primary winding 201 for regulating the off-time of power switch Q to limit the peak current in the primary winding of transformer 20.

In a switching mode power supply, when power switch Q is turned on, a primary current flows in the primary winding, and a negative voltage pulse is induced on auxiliary winding 202. Similarly, when power switch Q is turned off, the primary current stops flowing, and a current is induced in secondary winding 203 to provide output current to load Z. During the phase of the switching cycle when power switch Q is off, a positive voltage is induced on auxiliary winding 202. The inventors of the present invention have recognized that, in a switching cycle, the time integral of the absolute value of the negative voltage pulse across auxiliary winding 202 when power switch Q is turned on is equal to the time integral of the absolute value of the positive voltage pulse across the auxiliary winding 202 when power switch Q is turned off. Therefore, according to embodiments of the present invention, information provided in the first phase of the switching cycle, when power switch is on, can be used to control the power supply in the second phase of the switching cycle, when the power switch is off.

As described in detail below, in a specific embodiment, information obtained in the on-phase of the switching cycle is used to determine a timing instance for sampling the feedback signal during the off-phase of the same switching cycle for controlling the power supply. In another embodiment, information obtained in the on-phase is used in a protective circuit of the power supply.

Figure 2:
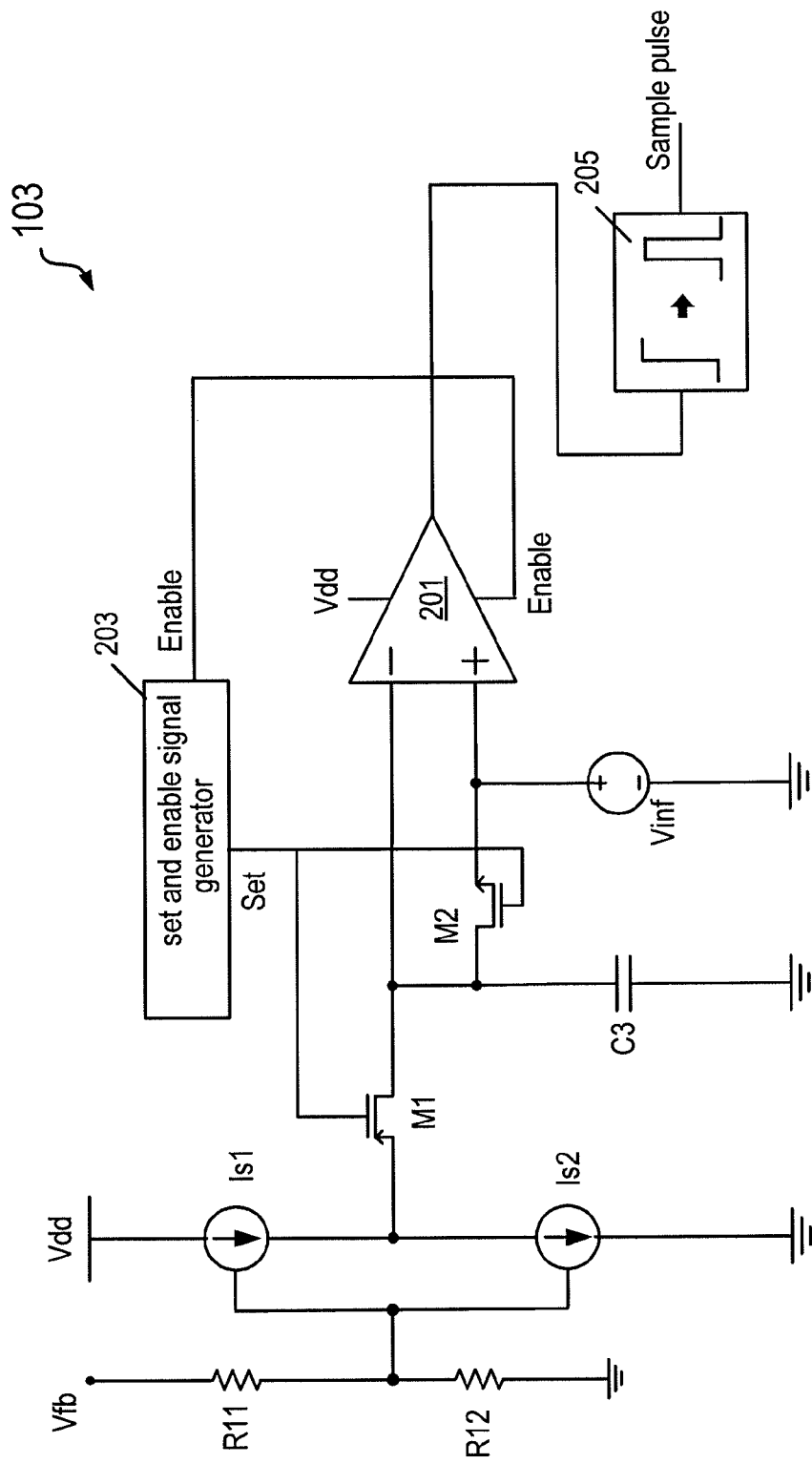
FIG. 2 is a simplified circuit/block diagram illustrating the sampling signal generating circuit of FIG. 1 according to an embodiment of the present invention.

FIG. 2 is a simplified circuit/block diagram illustrating the sampling signal generating circuit of FIG. 1 according to an embodiment of the present invention. As shown, sampling signal generating circuit diagram 103 include a first current source Is1, a second current source Is2, a first switch M1, a second switch M2, a first voltage comparator 201, a reference voltage source Vinf, a first capacitor C3, a pulse device 205, and a set and enable signal generating circuit 203. In an embodiment, set and enable signal generating unit 203 generates a Set signal to control switches M1 and M2 and an Enable signal to control first voltage comparator 201. Reference voltage source Vinf is used to provide reference voltage Vinf, which is coupled to comparator 201. In the example shown in FIG. 2, switch M1 is a PMOS transistor and switch M2 is an NMOS transistors. In alternative embodiments, M1 and M2 can be other suitable switching devices, for example, complementary PNP and NPN bipolar transistors.

In FIG. 2, the positive terminal of the first current source Is1 is connected to a power supply Vdd, and its negative terminal is connected the positive terminal of the second current source Is2. The negative terminal of the second current source Is2 is grounded. The common node between of Is1 and Is2 is connected to the source of first switch M1. The gate of M1 is connected to a Set output of set and enable signal generating unit 203. The drain terminals of both M1 and M2 are connected to the negative input of first voltage comparator 201, and are also connected to the ground through capacitor C3. The source of second switch M2 is connected to the positive input of first voltage comparator 201. The gate of M2 is connected to the Set output of set and enable signal generating unit 203. The positive terminal of reference voltage source Vinf is connected to the positive input terminal of first voltage comparator 201. The output of first voltage comparator 210 is coupled to the input of pulse generator 205. Comparator 201 is also coupled to power supply Vdd and receives the Enable signal from set and enable signal generating unit 203. Pulse generator 205 outputs a sampling pulse signal referred to as Sample in FIG. 2.

In an embodiment, current sources Is1 and Is2 in FIG. 2 are voltage controlled current sources coupled to feedback voltage signal Vfb, and are used to charge and discharge capacitor C3. The first current source Is1 is used to generate a charge current Icg, which is proportional to the absolute value of negative feedback voltage Vfb. The second current source Is2 is used to generate a discharge current Idis, which is proportional to the absolute value of positive feedback voltage Vfb. Namely, $$I_{cg} = k1 * |V_{fb(-)}| \quad (1)$$

$$I_{dis} = k2 * |V_{fb(+)}| \quad (2)$$

where
Vfb (−) is the negative feedback voltage Vfb;
Vfb (+) is the positive feedback voltage Vfb; and
k1 and k2 are constants.

As shown in FIG. 2, switches M1 and M2 serve as control switches for charging and discharging capacitor C3, and both M1 and M2 are controlled by the Set signal. When power switch Q in FIG. 1 is turned on (by the PWM signal from PWM generator 104 in FIG. 1), the Set signal turns on switch M1 and turns off switch M2. At this time, current source Is1 charges capacitor C3. Conversely, when power switch Q is turned off, current source Is2 discharges capacitor C3. When the voltage on capacitor C3 is equal to a reference voltage Vinf, comparator 201 triggers pulse generator 205 to generate sampling pulse signal Sample. After that, the sampling pulse signal causes set and enable signal generating unit 103b to produce the Set signal to turn off switch M1 and turn on switch M2. At this time, the charge and discharge paths for capacitor C3 are closed, and capacitor C3 is set to reference voltage Vinf value until the start of a new cycle.

In FIG. 1, output feedback voltage Vfb is derived from the voltage across auxiliary winding Vaux through voltage divider resistors R1 and R2. It follows that $$V_{fb} = kV_{aux} \quad (3)$$

where $$k = \frac{R_2}{R_1 + R_2}$$

As shown in FIGS. 1 and 2, when the primary power switch Q is turned on, feedback voltage Vfb is negative, and can be expressed as:

$$|V_{fb(-)}| = k|V_{aux}| = k\frac{N_a}{N_p}V_{in} \quad (4)$$

where Na and Np are, respectively, transformer auxiliary winding turns and primary winding turns, and Vin is the line input voltage. On the other hand, when primary power switch Q is turned off, rectifier D2 is turned on, and feedback voltage Vfb is positive, $$|V_{fb(+)}| = k|V_{aux}| = k\frac{N_a}{N_s}V_s \quad (5)$$

wherein Na and Ns are respectively transformer auxiliary winding turns and secondary winding turns, and Vs is the voltage across secondary winding.

In a flyback switching power supply, the following relationships hold:

$$\frac{I_{pp}}{I_{sp}} = \frac{N_s}{N_p} \quad (6)$$

$$\frac{L_p}{L_s} = \frac{N_p^2}{N_s^2} \quad (7)$$

where Ipp and Isp are the primary winding and secondary winding peak currents, and Lp and Ls are the transformer primary winding inductance and secondary winding inductance respectively. According to Faraday's law, there are:

$$V_{in} = L_p \frac{dI_p}{dt} \quad (8)$$

$$V_s = L_s \frac{dI_s}{dt} \quad (9)$$

where Ip and Is are respectively transformer primary winding current value and secondary winding current value. From equations (4), (6), (7), and (8), during the primary power switch Q conduction time Tonp (Tonp=t1−t0):

$$\int_0^{t1} |V_{fb(-)}| dt = k\frac{N_a}{N_p}\int_0^{Tonp} V_{in} dt = k\frac{N_a}{N_p}L_p\int_0^{Tonp} dI_p = k\frac{N_a}{N_p}L_p I_{pp} \quad (10)$$

Similarly, from equations (5), (6), (7), and (9), during the secondary rectifier D2 conduction time Tons (Tons=t2−t1):

$$\int_0^{t2} |V_{fb(+)}| dt = k\frac{N_a}{N_s}\int_0^{Tons} V_s dt \quad (11)$$

$$= k\frac{N_a}{N_s}L_s\int_0^{Tons} dI_s$$

$$= k\frac{N_a}{N_s}L_s I_{sp}$$

$$= k\frac{N_a}{N_p}L_p I_{pp}$$

In a switch cycle of the power switch Q, from (10) and (11):

$$\int_0^{t1}|V_{fb(-)}|dt = \int_{t1}^{t2}|V_{fb(+)}|dt \quad (12)$$

In equation (12), the left-hand side represents the time integral of the absolute value of negative voltage across auxiliary winding 202 from time t0 to time t1, during which period power switch Q is turned on. Similarly, the right-hand of equation (12) represent the time integral the absolute value of positive voltage across auxiliary winding 202 from time t1 to time t2, during which period power switch Q is turned off and secondary winding 203 provides power to the load Z. According to equation (12), the time integrals of the absolute values of the negative voltage and positive voltage are equal during a switch cycle of power switch Q. In embodiments of the invention, during the power switch Q conduction time Tonp (t0 to t1, when current flows in the primary winding), the average absolute value of feedback voltage Vfb is defined as V1, and during the power switch Q cut-off time Tons (t1 to t2, when current flows in the secondary winding), the average absolute value of feedback voltage Vfb is defined as V2. For a practical flyback switching power supply concerned, V1 and V2 are approximately constant, $$V_1 T_{onp} = V_2 T_{ons} \quad (13)$$

According to equation (13), if V1 or V2 are used to charge a capacitor, then the total charges accumulated on the capacitor during Tonp is substantially the same as the total charges accumulated on the capacitor during Tons during the same switching cycle. According to an embodiment of the invention, the amount of total charges is determined during Tonp by charging a capacitor using a current derived from V1. An desirable time for the sample-and-hold circuit to sample the feedback signal Vfb can be determined by the time for discharging the capacitor using a second current derived from V2.

As described further below in connection with FIGS. 2 and 3, a charging current Icg for capacitor C3 is derived from V1, Icg=k1*V1, during the time the primary winding is turned on. Similarly, the charging current Idis for capacitor C3 is derived from V2, Idis=−k2*V2 (negative sign means discharge current), during the time the secondary winding is turned on. The timing of the sampling signal during Tons (or the Tons voltage pulse) is based on a ratio of the charging current and discharging current. For example if the discharging current is twice as large as the charging current, Idis=2*Ich, then the sampling signal is issued about half way into Tons, when Vfb is relatively stable and representative of the output state of the power supply. In another example, if k1/k2=2/3, the sampling pulse signal generation time is always at the time of 2/3 of Tons, thus allowing to generate a sampling signal at 2/3 of the positive voltage. In the circuit diagrams of the current sources in FIG. 5, the ratio of charging and discharging currents can be determined by resistors R11, R12, and R13 and the size ratios of the transistors in the current mirrors. Of course, other ratios, such as 1/2 or 4/5 can also be used.

Under normal circumstances, a flyback switching power supply is in a stable state, and its Tons has a fixed value. However, in some cases, flyback switching power supply may be unstable, and Tons may vary. In embodiments of the present invention, the sampling pulse signal is generated at a time determined by the voltage during Tonp. Even if Tons changes, the sampling pulse signal generation time T will reflect the changes during Tonp. Under this condition, the output voltage is not sensitive to the variation of primary peak current, thus ensuring system stability.

Figure 3:
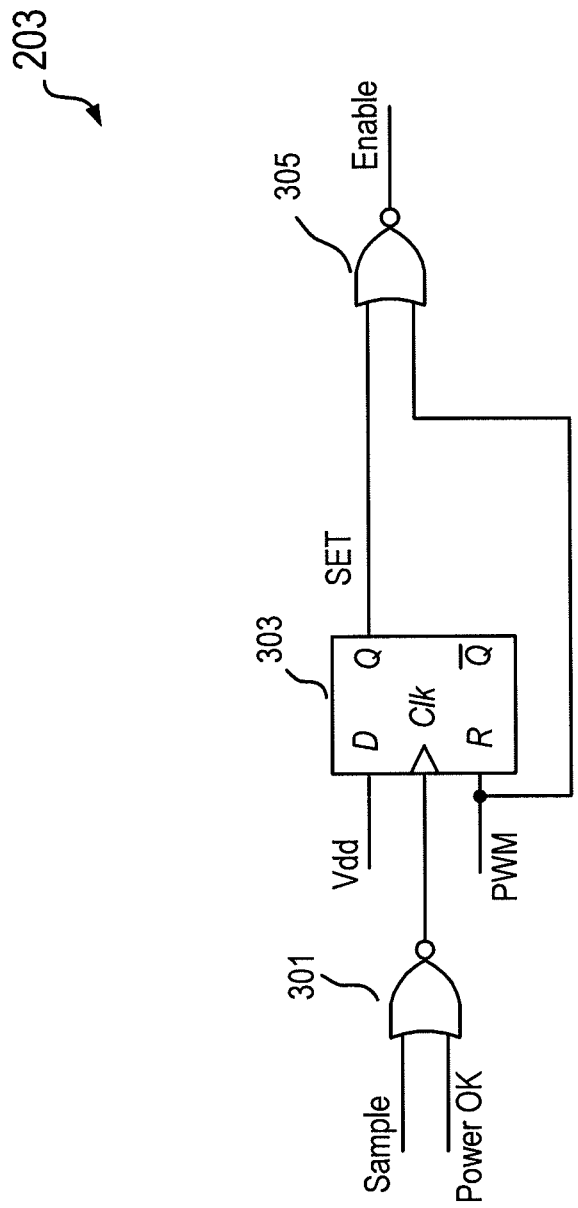
FIG. 3 is a simplified circuit diagram illustrating the set and enable signal generating circuit of FIG. 2 according to an embodiment of the present invention.

FIG. 3 is a simplified circuit diagram illustrating set and enable signal generating unit 203 of FIG. 2 according to an embodiment of the present invention. As shown, set and enable signal generating unit 203 includes a first NOR gate 301, a D flip-flop 303, and a second NOR gate 305. The inputs of NOR gate 301 receive the Sample signal from pulse generator 103 and a startup signal designated as "Power OK." The output of NOR gate 301 is coupled to the clock input of D flip-flop 303. The D input of D flip-flop 303 is coupled to power supply voltage Vdd, and the reset input R of D flip-flop 303 is coupled to the switch signal output PWM of control circuit 10 in FIG. 1. The inputs of NOR gate 305 are coupled to the Q output of D flip-flop 303 and the switch signal output PWM of control circuit 10. Note that the outputs of set and enable signal generating unit 203 are the "Set" signal at the Q output of D flip-flop 303 and the "Enable" signal at the output of NOR gate 305.

As shown in FIG. 3, the rising edge of the output of NOR gate 301 triggers the D flip-flop 303, causing the Q output to go high and produce Set signal. When switch signal (PWM) of the control circuit 10 is high, the Set signal at the Q output of D flip-flop 303 is low. As described above in connection to FIG. 2, the low Set signal causes switch M1 to turn on and switch M2 to turn off, allowing currents in proportional to Vfb to charge and discharge capacitor C3 until the arrival of the rising edge of the Set signal corresponding to the completion sampling. The startup signal Power OK sets capacitor C3 at a reference voltage when the controller IC is starting up. As described above in connection to FIG. 2, the Enable signal at the output of NOR gate 305 controls comparator 201, allowing comparator 201 to work only in the duration from the time capacitor C3 is almost fully charged to the completion of sampling.

Figure 4:
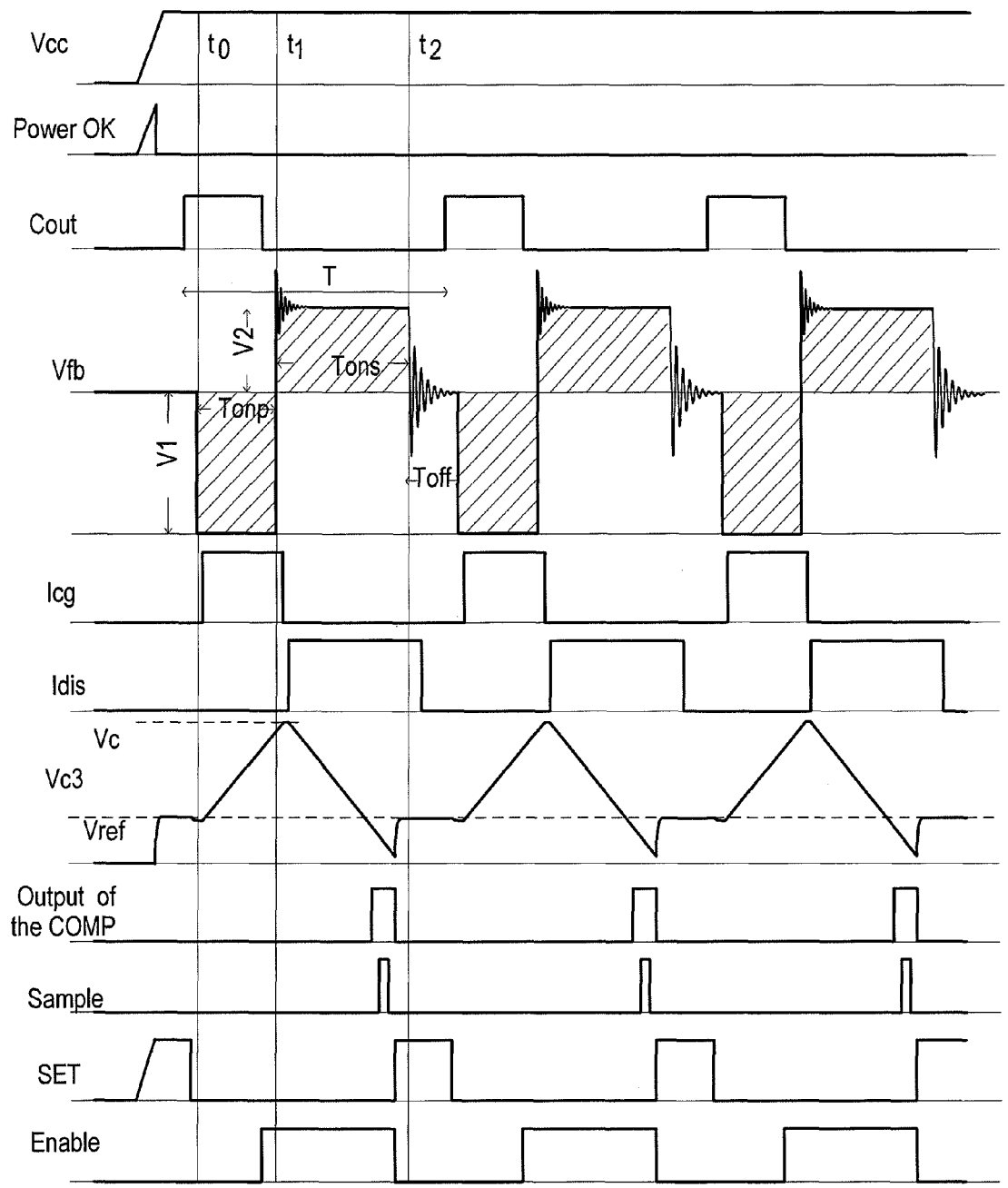
FIG. 4 is a waveform diagram illustrating signals at various circuit nodes in FIG. 2 according to an embodiment of the present invention.

FIG. 4 is a waveform diagram of signals at various'circuit nodes in FIG. 2 illustrating of operation of controller 10 according to an embodiment of the present invention. In FIG. 4, Vcc is the power supply voltage of switching power supply control circuit 10. "Power OK" is the startup signal. When startup of switching power supply control circuit 10 is completed, the value of Power OK is set to low, and the Set signal in FIG. 3 is high, which turns on switch M2 in FIG. 2 and sets capacitor C3 to the value of reference voltage source Vinf. Cout is the waveform of output switch signal Cout supplied to the power switch of the switching power supply controller 10. When Cout=1, power switch Q is turned on, and the current in the primary winding increases, inducing a negative voltage across the auxiliary winding 202 of transformer 20. While the Set signal in FIGS. 3 and 4 is set low, switch M1 is on and switch M2 is off. As shown in FIG. 4, feedback voltage Vfb at this time is negative, while the charge current Icg starts to charge C3. Vc3, the capacitor C3 voltage, begins to rise from the initial value Vref to Vc, the added voltage value represents the time integral of the absolute value of negative feedback voltage Vfb. When Cout=0, power switch Q turns off, and feedback voltage Vfb is positive. Discharge current Idis begins to discharge capacitor C3. When the voltage of capacitor C3 drops to reference voltage Vref, voltage comparator 201 outputs a high voltage, and pulse generator 205 outputs the Sample pulse. When the Sample pulse switches from high potential to low potential, the Set signal is set to high, causing switch M1 to turn off and switch M2 to turn on. Thus, the cycle repeats as shown in FIG. 4. Here, Vref can be set at a suitable value for comparator. In specific embodiment, for example, Vref=1V for Vdd=5V.

Figure 5:
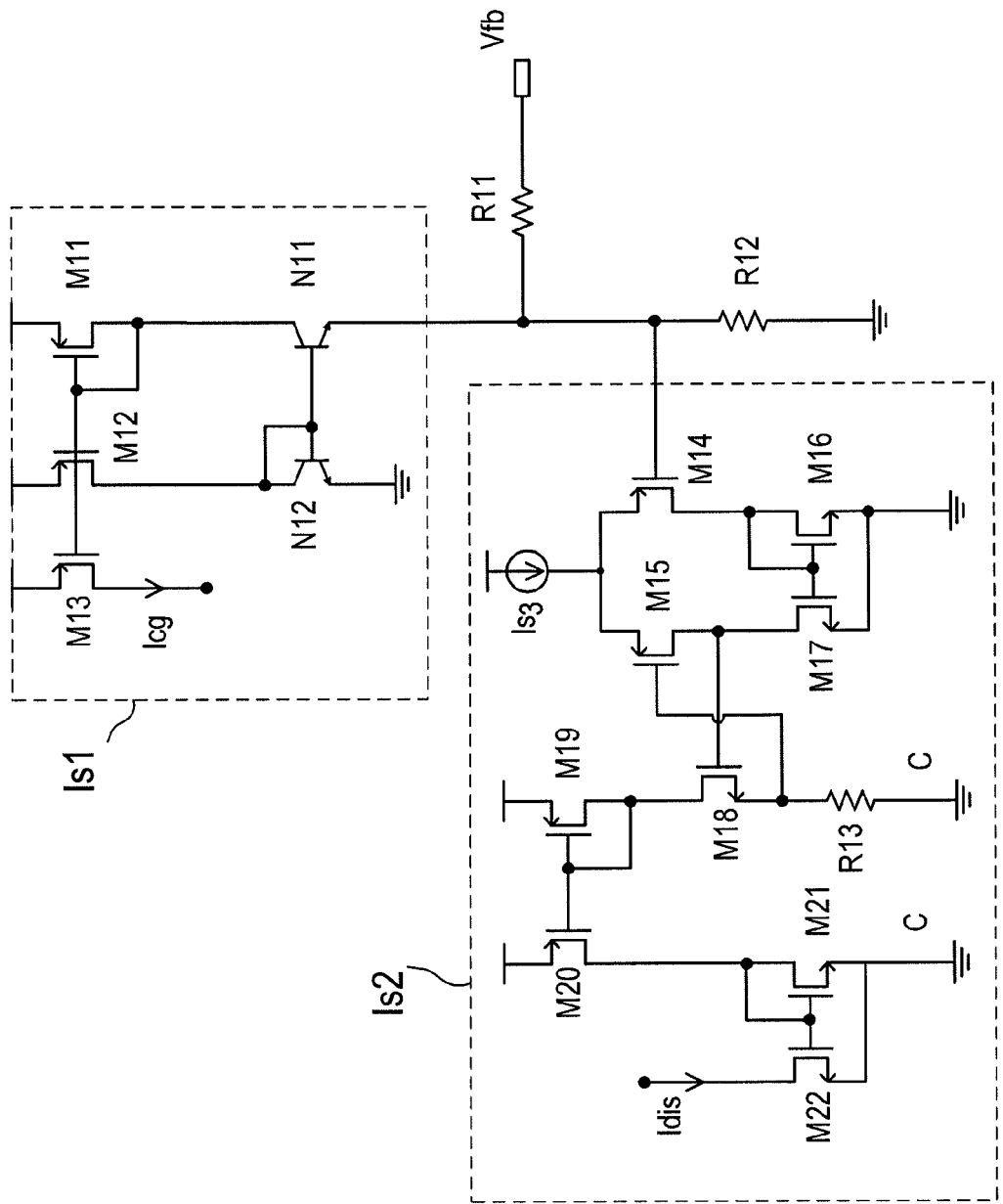
FIG. 5 is a simplified circuit diagram illustrating voltage-controlled current sources FIG. 2 according to an embodiment of the present invention.

FIG. 5 is a simplified circuit diagram illustrating voltage-controlled current sources Is1 an Is2 of FIG. 2 according to an embodiment of the present invention. As shown, current sources Is1 and Is2 are coupled to feedback voltage Vfb through a voltage divider formed by a first resistor R11 and a second resistor R12. Current source Is1 includes a first resistor R11, a first NPN transistor N11, a second NPN transistor N12, a first MOS power transistor M11, a second MOS power transistor M12, and a third MOS power transistor M13. In FIG. 5, resistor R11 is connected between feedback voltage input Vfb of control circuit 10 and NPN transistor N11. Charging current Icg is provided at the output of transistor M13.

Current source Is2 includes a second resistor R12, a third resistor R13, a fourth MOS power transistor M14, a fifth MOS power transistor M15, a sixth MOS power transistor M16, a seventh MOS power transistor M17, an eighth MOS power transistor M18, a ninth MOS power transistor M19, a tenth MOS power transistor M20. Current source Is2 also includes a third current source Is3; which is a constant current source. Discharging current Idis is provided by transistor M20.

When power switch Q is on, feedback voltage Vfb is negative. As shown in FIG. 5, one terminal of resistor R11 is connected the emitter of NPN transistor N11. Through the current mirror of N11 and N12, the emitter voltage of N11 is equal to zero. As a result, the current through resistor R12 is equal to zero. At this point, the current through resistor R11 all flows through N11. By the current mirror composed of M11 and M12, the resulting value of charge current Icg is equal to negative feedback voltage Vfb divided by the value of the first resistor R11.

When power switch Q turns off, the feedback voltage Vfb is positive, and transistor N11 is off. The voltage Vfb is applied to the gate of transistor M14 through voltage divider R11 and R12. Transistors M14-M17 form a differential amplifier. The gate voltages of M15 and M14 are equal due to the feedback of M18 and resistor R13. Thus, feedback voltage Vfb is converted to a current through resistor R13, which is mirrored by the current mirror structure composed of M19 and M20. The current through M20 is further reflected through current mirror M21 and M22 to provide discharge current Idis, which is determined by the divided feedback positive voltage through R11 and R12 and the third resistor R13. In an embodiment, a ratio between Idis and Ich can be determined by selecting appropriate resistance values for R11, R12, and R13.

Figure 6:
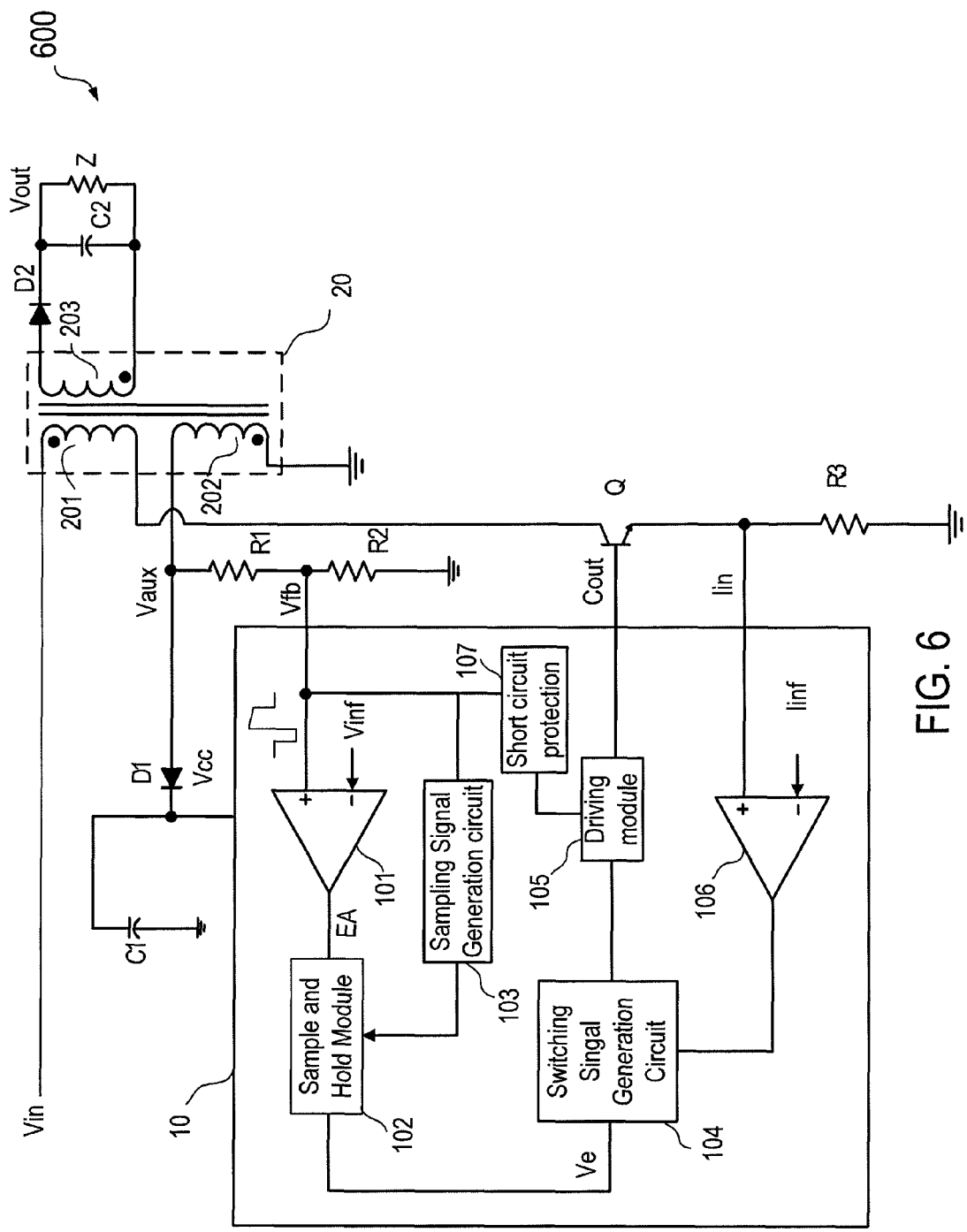
FIG. 6 is a simplified block diagram illustrating a fly back converter according to another embodiment of the present invention.

FIG. 6 is a simplified block diagram illustrating a fly back converter 600 according to another embodiment of the present invention. In the embodiment of FIG. 1, the current of the primary winding 201 generates a voltage on resistor R3. Comparator 106 in controller circuit 10 detects the voltage on R3 and compares it with inner current reference voltage signal Iinf. According to the comparison result the PWM signal generating circuit 104 generates switching signals to determine the on-time of the power switch Q and to achieve the limitation of peak current in the primary winding of transformer 20. However, if resistor R3 is shorted, it can cause uncontrolled primary peak current. Therefore, an alternative embodiment of switching power supply of the present invention further includes a short-circuit protection unit for protection against a shorted resistor R3. As shown in FIG. 6, SMPS 600 has substantially the same components as SMPS 100 of FIG. 1, with the exception of the short circuit protection module 107. As shown, short circuit protection module 107 is connected between a feedback pin Fin and driving module 105. More details of module 107 is described below.

Figure 7:
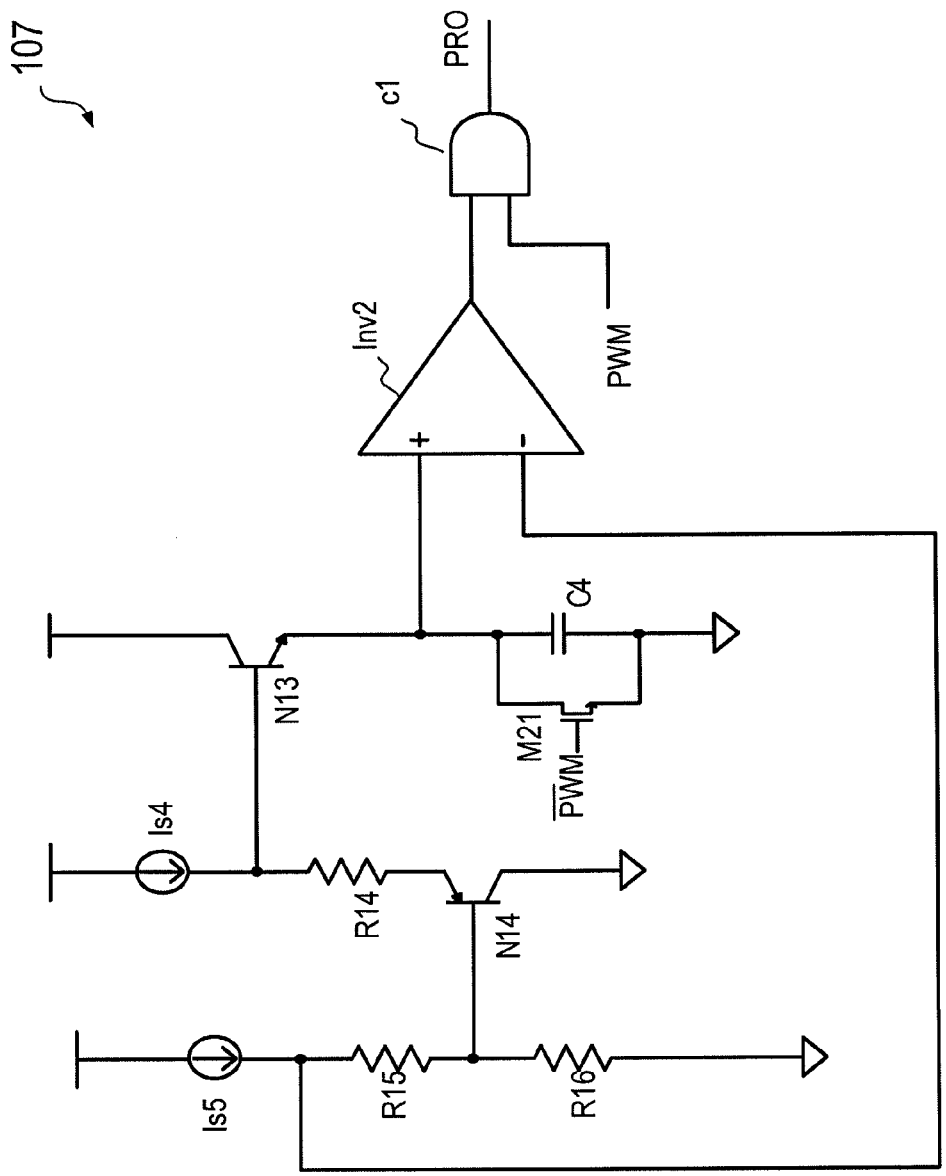
FIG. 7 is a simplified circuit diagram illustrating an example of a short circuit protection module of FIG. 6 according to an embodiment of the present invention.

FIG. 7 is a simplified circuit diagram illustrating an example of short circuit protection module 107 of FIG. 6 according to an embodiment of the present invention. As shown, short circuit protection module 107 includes an AND gate c1, a voltage comparator Inv2, a third NPN N13, a fourth NPN N14, a second capacitor C4, a eleventh MOSFET M21, a fourth resistor R14, a fifth resistor R15, a sixth resistor R16, a fourth current source Is4, and a fifth current source Is5;

In FIG. 7, current source Is4 is a constant current source which outputs a constant current. Current source Is5 is a voltage-controlled current source configured to provide a charging current Icg based on the absolute value of the feedback voltage Vfb. In an embodiment, current source Is5 can be similar to current source Is1 shown in FIG. 2. As shown in FIG. 7, the input of the said fifth current source Is5 is connected to Vdd and the output is connected to resistor R15. The other end of R15 is coupled to GND through resistor R16. The common node between resistor R15 and resistor R16 is connected to the base of NPN transistor N14. The emitter of NPN transistor N14 is connected to R14, and the collector is connected to GND. The other end of R14 is connected to the output of current source Is4, and the base of the NPN transistor N13. The input of current source Is4 is connected to Vdd. The collector of NPN transistor N13 is connected to Vdd. The emitter of N13 is connected to the positive input of the voltage comparator Inv2 and the drain of MOSFET N21 and capacitor C4. The other end of capacitor C4 is connected to GND. The source of N14 is connected to GND, and its gate is connected to the inverse of the switch signal PWM. The negative input of comparator Inv2 is connected to the output of current source Is5. The output of comparator Inv2 is connected to one input of AND gate c1, and the other input of AND gate c1 is connected with the switch signal PWM. The output of AND gate c1 provides a protection signal "PRO" to the input of driving module 105 in FIG. 6.

Current source Is5 in FIG. 7, similar to current source Is1 in FIG. 2, is controlled by feedback voltage Vfb when the power switch is turned on. During this period, Vfb is negative, as shown in FIG. 4. When the absolute value of the negative voltage of Vfb is higher, the current from Is5 is also larger. IRIS and R16 form a voltage divider. Current source Is4, resistor R14, and bipolar transistors N14 and N13 form a voltage follower, whose output is connected to capacitor C4. Thus, when the magnitude of Vfb rises, the voltage on capacitor C4 follows. However, when the absolute value of Vfb is reduced, the voltage of capacitor C4 will hold. So the positive input to comparator Inv2 is:

$$V_+ = k_1 R_{16} |V_{fb(-)max}| + V_{offset} \qquad (17)$$

Where Vfb(−)max is the maximum value of the negative feedback voltage Vfb, and Voffset is the voltage drop of the R14 when current Is4 flows across. The negative input voltage of the said second voltage comparator Inv2 is:

$$V_-=k_1(R_{16}+R_{15})|V_{fb(-)}| \quad (18)$$

If the V− is smaller than V+ when the Cout=1, comparator Inv2 will turn to high, and the power switch will be turned off.

In power supply 100, for example, when the current sense resistor is shorted to ground, switching controller 10 can not turn off the power switch Q, and the current in the primary winding will increasing without control, and may damage the power switch, or other components in the system. The protection circuit described above can be used to alleviate this problem. Protection circuit records the maximum magnitude of feedback signal, and if the feedback signal falls below a certain fraction of the maximum, the protection circuit issues a signal to turn off the power switch. In the embodiment described above, the fraction can be determined by selecting proper resistance values for resistors R15 and R16 in FIG. 7.

In the embodiment of FIG. 7, current source Is5 is similar to current source Is1 in FIG. 2, and is controlled by feedback voltage Vfb when the power switch is turned on. During this period, Vfb is negative, as shown in FIG. 4. In an alternative embodiment, the protection circuit can also use a current source controlled by feedback voltage Vfb when the power switch is turned off, during which period Vfb is positive, as shown in FIG. 4. In this embodiment, the protection circuit is configured to monitor the first voltage pulse of feedback signal Vfb to obtain a maximum magnitude of the feedback signal, compare the feedback signal with the maximum magnitude, and, based on the results of such comparison, issue a protection signal for turning off the power switch. In one embodiment, the protection circuit issues the protection signal for turning off the power switch, when the feedback signal drops below a pre-defined fraction of the maximum magnitude. In another embodiment, the protection circuit issues the protection signal for turning off the power switch, when the feedback signal is smaller than the maximum magnitude by a pre-determined amount. In this alternative embodiment, the protection circuit can be implemented using a circuit structure similar to protection circuit 107 in FIG. 7, with appropriate polarities reversed. For example, an NPN bipolar transistor is replaced by a PNP transistor, and vice versa, NMOS is replaced by PMOS, and vice versa, and connections to power and ground are reversed, etc.

While embodiments of the present invention are described with reference to specific examples, it is understood that the above description is for illustrative purposes only. Various modifications or changes in light thereof will be suggested to persons skilled in the art and are to be included within the spirit and purview of this application.

What is claimed is:

1. A control circuit for controlling the output power of a switched mode power supply (SMPS), the SMPS including a transformer with a primary winding, a secondary winding, and an auxiliary winding, the SMPS also including a power switch coupled to the primary winding, wherein during one switching cycle, the auxiliary winding provides a feedback signal which includes a first voltage pulse that is induced after the power switch is turned on and a second voltage pulse that is induced after the power switch is turned off,
the control circuit comprising:
a sampling signal generation circuit for generating a sampling signal for sampling the second voltage pulse in a switching cycle at a time that is determined based on the first voltage pulse in said switching cycle;
a sample-and-hold circuit coupled to the sampling generation circuit for receiving the sampling signal, the sample-and-hold circuit being configured for sampling the second voltage pulse in response to the sampling signal and storing the sampled value of the second voltage pulse; and
a switching signal generation circuit coupled to the sample-and-hold circuit, the switching signal generation circuit being configured to generate a switching signal for controlling the power switch based on an output of the sample-and-hold circuit.

2. The control circuit of claim 1, wherein the sampling signal generation circuit comprises:
a capacitor:
a first current source for charging the capacitor, the first current source providing a charging current derived from the first voltage pulse of the feedback signal; and
a second current source for discharging the capacitor, the second current source providing a discharging current derived from the second voltage pulse of the feedback signal;
wherein the capacitor is charged during the first voltage pulse and then discharged during the second voltage pulse;
wherein the sampling signal generation circuit is configured to generate the sampling signal when the capacitor is discharged to a reference voltage level.

3. The control circuit of claim 2, wherein the sampling signal generation circuit is configured to generate the sampling signal when total charges accumulated on the capacitor during the first voltage pulse are substantially discharged during the second voltage pulse.

4. The control circuit of claim 2, wherein a timing of the sampling signal during the second voltage pulse is based on a ratio of the charging current and discharging current.

5. The control circuit of claim 2, wherein the first current source comprises:
first and second NPN bipolar transistors in a current-mirror configuration, wherein an emitter of the first NPN bipolar transistor is coupled to the feedback signal through a resistive voltage divider formed by first and second resistors, and an emitter of the second NPN bipolar transistor is coupled to ground;
first and second PMOS transistors in a current-mirror configuration, the drain terminals of the first and second PMOS transistors being coupled to corresponding collector terminals of the first and second NPN bipolar transistors; and
a third PMOS transistor coupled to the first and second PMOS transistors for providing the charging current.

6. The control circuit of claim 2, wherein the second current source comprises:
a differential amplifier having a positive input coupled to the feedback signal through the resistive voltage divider;
an NMOS transistor having a gate coupled to an output of the differential amplifier and source coupled to a negative input of the differential amplifier;
a third resistor coupled between a source of the NMOS transistor and the ground; and
a current-mirror coupled to the NMOS transistor for providing the discharging current.

7. The control circuit of claim 2, wherein the sampling signal generation circuit further comprises a signal generator circuit, the signal generator circuit comprising:
a first NOR gate for receiving the sampling signal and a startup signal;

a D flip-flop having a clock terminal coupled to an output of the first NOR gate, a data terminal coupled to a power supply, and a reset terminal coupled to the switching signal; and a second NOR gate having a first input coupled to an output of the D flip-flop and a second input coupled to the switching signal;

wherein the output of the D flip-flop is provides a signal for controlling the charging and discharging of the capacitor, and wherein an output of the second NOR gate provides a signal for triggering a comparison between a voltage on the capacitor with the reference voltage level.

8. A switched mode power supply (SMPS), comprising:
a transformer with a primary winding, a secondary winding, and an auxiliary winding;
a power switch coupled to the primary winding; and
a control circuit for controlling the output power of the SMPS;
wherein during one switching cycle, the auxiliary winding provides a feedback signal which includes a first voltage pulse that is induced after the power switch is turned on and a second voltage pulse that is induced after the power switch is turned off;
wherein the control circuit comprises:
a sampling signal generation circuit for generating a sampling signal for sampling the second voltage pulse in a switching cycle at a time that is determined based on the first voltage pulse in said switching cycle;
a sample-and-hold circuit coupled to the sampling generation circuit for receiving the sampling signal, the sample-and-hold circuit being configured for sampling the second voltage pulse in response to the sampling signal and storing the sampled value of the second voltage pulse, and
a switching signal generation circuit coupled to the sample-and-hold circuit, the switching signal generation circuit being configured to generate a switching signal for controlling the power switch based on an output of the sample-and-hold circuit.

9. The power supply of claim 8, wherein the sampling signal generation circuit comprises:
a capacitor:
a first current source for charging the capacitor, the first current source providing a charging current derived from the first voltage pulse of the feedback signal; and
a second current source for discharging the capacitor, the second current source providing a discharging current derived from the second voltage pulse of the feedback signal;
wherein the capacitor is charged during the first voltage pulse and then discharged during the second voltage pulse;
wherein the sampling signal generation circuit is configured to generate the sampling signal when the capacitor is discharged to a reference voltage level.

10. The power supply of claim 9, wherein the sampling signal generation circuit is configured to generate the sampling signal when total charges accumulated on the capacitor during the first voltage pulse are substantially discharged during the second voltage pulse.

11. The power supply of claim 9, wherein the first current source comprises:
first and second NPN bipolar transistors in a current-mirror configuration, wherein an emitter of the first NPN bipolar transistor is coupled to the feedback signal through a resistive voltage divider formed by first and second resistors, and an emitter of the second NPN bipolar transistor is coupled to ground;
first and second PMOS transistors in a current-mirror configuration, the drain terminals of the first and second PMOS transistors are coupled to corresponding collector terminals of the first and second NPN bipolar transistors; and
a third PMOS transistor coupled to the first and second PMOS transistors for providing the charging current.

12. The power supply of claim 9, wherein the second current source comprises:
a differential amplifier having a positive input coupled to the feedback signal through the resistive voltage divider;
an NMOS transistor having a gate coupled to an output of the differential amplifier and source coupled to a negative input of the differential amplifier; and
a third resistor coupled between a source of the NMOS transistor and the ground;
a current-mirror coupled to the NMOS transistor for providing the discharging current.

13. The power supply of claim 9, wherein the sampling signal generation circuit further comprises a signal generator circuit, the signal generator circuit comprising:
a first NOR gate for receiving the sampling signal and a startup signal;
a D flip-flop having a clock terminal coupled to an output of the first NOR gate, a data terminal coupled to a power supply, and a reset terminal coupled to the switching signal; and
a second NOR gate having a first input coupled to an output of the D flip-flop and a second input coupled to the switching signal;
wherein the output of the D flip-flop is provides a signal for controlling the charging and discharging of the capacitor, and
wherein an output of the second NOR gate provides a signal for triggering a comparison between a voltage on the capacitor with the reference voltage level.

14. A method for controlling the output power of a switched mode power supply (SMPS), the SMPS including a transformer with a primary winding and a power switch coupled to the primary winding, wherein during one switching cycle, a feedback signal includes a first voltage pulse that is induced after the power switch is turned on and a second voltage pulse that is induced after the power switch is turned off,
the method comprising:
generating a sampling signal for sampling the second voltage pulse in a switching cycle at a time that is determined based on the first voltage pulse in said switching cycle;
sampling the second voltage pulse in response to the sampling signal and storing the sampled value of the second voltage pulse; and
generating a switching signal for controlling the power switch based on the stored sampled value of the second voltage pulse.

15. The method of claim 14, wherein generating a sampling signal comprises:
charging a capacitor using a charging current derived from the first voltage pulse of the feedback signal;
discharging the capacitor using a discharging current derived from the second voltage pulse of the feedback signal; and
generating the sampling signal when the capacitor is discharged to a reference voltage level.

16. The method of claim 14, wherein generating a sampling signal comprises:
  charging a capacitor using a charging current derived from the first voltage pulse of the feedback signal;
  discharging a capacitor using a discharging current derived from the second voltage pulse of the feedback signal; and
  generating the sampling signal when total charges accumulated on the capacitor during the first voltage pulse are substantially discharged during the second voltage pulse.

17. The method of claim 16, further comprising providing the charging current using a first current source that includes:
  first and second NPN bipolar transistors in a current-mirror configuration, wherein an emitter of the first NPN bipolar transistor is coupled to the feedback signal through a resistive voltage divider formed by first and second resistors, and an emitter of the second NPN bipolar transistor is coupled to ground;
  first and second PMOS transistors in a current-mirror configuration, the drain terminals of the first and second PMOS transistors are coupled to corresponding collector terminals of the first and second NPN bipolar transistors; and
  a third PMOS transistor coupled to the first and second PMOS transistors for providing the charging current.

18. The method of claim 16, further comprising providing the discharging current using a second current source that includes:
  a differential amplifier having a positive input coupled to the feedback signal through the resistive voltage divider;
  an NMOS transistor having a gate coupled to an output of the differential amplifier and source coupled to a negative input of the differential amplifier;
  a third resistor coupled between a source of the NMOS transistor and the ground; and
  a current-mirror coupled to the NMOS transistor for providing the discharging current.

19. A method for controlling a switch mode power supply (SMPS), the SMPS including a transformer with a primary winding, a secondary winding, and an auxiliary winding, the SMPS also including a power switch coupled to the primary winding, wherein during one switching cycle, the auxiliary winding provides a feedback signal which includes a first voltage pulse that is induced after the power switch is turned on and a second voltage pulse that is induced after the power switch is turned off, the method comprising:
  monitoring the first voltage pulse of the feedback signal to obtain a maximum magnitude of the feedback signal;
  continuing to sample the first voltage pulse to determine the magnitude of the feedback signal;
  comparing the sampled magnitude of the feedback signal with the maximum magnitude; and
  providing a protection signal for turning off the power switch based on comparing the sampled magnitude of the feedback signal with the maximum magnitude, and when the sampled magnitude of the feedback signal drops below a pre-defined fraction of the maximum magnitude.

20. The method of claim 19, comprising providing the protection signal for turning off the power switch, when the feedback signal is smaller than the maximum magnitude by a pre-determined amount.

21. A protection circuit operable to perform the method of claim 19, the protection circuit comprising:
  a voltage-controlled current source configured to provide a current representing the feedback signal;
  first and second resistors in a voltage divider configuration and coupled to the current source;
  a voltage follower circuit including a constant current source, a resistor, an NPN transistor, and a PNP transistor;
  a capacitor coupled to the voltage follower;
  an MOS transistor connected in parallel with the capacitor, a gate of the MOS transistor being coupled to a switch signal for controlling the power switch; and
  a comparator with a first input coupled to the capacitor and a second input coupled to the voltage-controlled current source.

22. A switch mode power supply (SMPS) including a transformer with a primary winding, a secondary winding, and an auxiliary winding, the SMPS also including a power switch coupled to the primary winding, wherein during one switching cycle, a first voltage pulse is induced after the power switch is turned on, and a second voltage pulse is induced after the power switch is turned off,
  Wherein the SMPS is operable to perform the method according to claim 21.

23. The control circuit of claim 1, wherein the sampling signal generation circuit is configured for generating a sampling signal for sampling the second voltage pulse in a switching cycle at a time that is determined based on information obtained in the on-phase of the switching cycle when the power switch is turned on.

24. The control circuit of claim 1, wherein the sampling signal generation circuit is configured for generating a sampling signal for sampling the second voltage pulse in a switching cycle at a time that is determined based on a time integral of the first voltage pulse in said switching cycle.

* * * * *